United States Patent
Cartwright et al.

(10) Patent No.: US 6,537,483 B1
(45) Date of Patent: *Mar. 25, 2003

(54) PRESSURE EQUALIZED VACUUM RESIN INFUSION PROCESS

(75) Inventors: Craig Lawrence Cartwright, Jacksonville, FL (US); Joshua James Radice, Jacksonville, FL (US)

(73) Assignee: The B. F. Goodrich Company, Richfield, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/245,524

(22) Filed: Feb. 5, 1999

(51) Int. Cl.$^7$ .............................................. B29C 70/44
(52) U.S. Cl. .................... 264/511; 264/102; 264/257; 264/258; 264/314; 264/316; 264/516; 264/570; 264/571
(58) Field of Search ................... 264/510, 511, 264/102, 40.6, 316, 314, 516, 257, 258, 570, 571; 425/542

(56) References Cited

U.S. PATENT DOCUMENTS

| | | | | |
|---|---|---|---|---|
| 2,517,090 A | * | 8/1950 | Denning | 264/136 |
| 2,531,218 A | * | 11/1950 | Johnson | 264/512 |
| 2,794,756 A | * | 6/1957 | Leverenz | 428/71 |
| 2,977,269 A | * | 3/1961 | Nerwick | 264/102 |
| 4,312,829 A | * | 1/1982 | Fourcher | 264/571 |
| 4,359,437 A | * | 11/1982 | Le Comte | 264/102 |
| 4,560,523 A | * | 12/1985 | Plumley et al. | 264/102 |
| 4,609,519 A | * | 9/1986 | Pichard et al. | 264/510 |
| 4,765,942 A | * | 8/1988 | Chirstensen et al. | 264/510 |
| 4,808,362 A | * | 2/1989 | Freeman | 264/257 |
| 4,816,106 A | * | 3/1989 | Turris et al. | 156/285 |
| 4,824,509 A | * | 4/1989 | Tonoki et al. | 156/285 |
| 4,883,632 A | * | 11/1989 | Goto et al. | 264/544 |
| 4,902,215 A | * | 2/1990 | Seemann, III | 425/406 |
| 4,915,896 A | * | 4/1990 | Rachal | 264/511 |

(List continued on next page.)

FOREIGN PATENT DOCUMENTS

| | | |
|---|---|---|
| EP | 0 603 896 A | 6/1994 |
| FR | 2 673 571 A | 9/1992 |
| GB | 535 611 A | 4/1941 |
| GB | 2 119 305 A | 11/1983 |
| GB | 2 267 457 A | 12/1993 |

OTHER PUBLICATIONS

Yasohiro Itou, Apparatus for Molding and Hardening Resinuous Composite Structures, Patent Abstracts of Japan, Jul. 1983.*

Patent Abstracts of Japan, vol. 013, No. 118 (M–806), Mar. 23, 1989 &JP 63 293039 A (Matsushita Electric Works LTD), Nov. 30, 1988 abstract; figures, 1,2.

*Primary Examiner*—Stefan Staicovici
(74) *Attorney, Agent, or Firm*—Renner, Otto, Boisselle & Sklar, LLP

(57) ABSTRACT

A method of manufacturing a resin impregnated article includes the steps of providing a mold onto which a reinforcing material is placed, sealing the reinforcing material with an impervious sheet and regulating the pressure on the material and temperature of the material and resin by placing a fluid in contact with the impervious sheet and regulating the pressure and temperature of the fluid.

29 Claims, 2 Drawing Sheets

U.S. PATENT DOCUMENTS

| | | | |
|---|---|---|---|
| 4,942,013 A | * 7/1990 | Palmer et al. | 264/511 |
| 5,013,514 A | * 5/1991 | Azzani et al. | 264/512 |
| 5,152,949 A | * 10/1992 | Leoni et al. | 264/257 |
| 5,176,777 A | * 1/1993 | Guilhem | 156/245 |
| 5,348,602 A | * 9/1994 | Makarenko et al. | 156/161 |
| 5,374,388 A | * 12/1994 | Frailey | 264/510 |
| 5,403,537 A | * 4/1995 | Seal et al. | 264/511 |
| 5,464,337 A | * 11/1995 | Bernardon et al. | 425/112 |
| 5,500,164 A | * 3/1996 | Livesay et al. | 264/459 |
| 5,545,026 A | * 8/1996 | Fritz et al. | 425/389 |
| 5,576,030 A | * 11/1996 | Hooper | 425/112 |
| 5,578,158 A | * 11/1996 | Gutowski et al. | 156/285 |
| 5,679,388 A | * 10/1997 | Fritz et al. | 425/387.1 |
| 5,702,663 A | * 12/1997 | Seemann | 264/510 |
| 5,795,536 A | * 8/1998 | Gaworowski et al. | 264/571 |
| 5,928,597 A | * 7/1999 | Van Ert | 264/316 |
| 5,971,742 A | * 10/1999 | McCollum et al. | 425/542 |
| 6,007,917 A | * 12/1999 | Weigel et al. | 428/408 |
| 6,149,844 A | * 11/2000 | Graham | 264/71 |

* cited by examiner

PRESSURE EQUALIZED VACUUM RESIN INFUSION PROCESS

FIELD OF THE INVENTION

The present invention relates to resin impregnated fiber composites and more particularly to a manufacturing process for manufacturing resin impregnated fiber composites utilizing fluid to apply pressure to the composite.

BACKGROUND OF THE INVENTION

Fiber reinforced composite parts are fabricated utilizing a variety of conventional techniques including vacuum resin infusion, resin transfer molding (RTM), prepreg/autoclave procedures, and compression molding operations. Vacuum resin infusion consists of infusing a preform with liquid resin under vacuum using a one sided tool. Resin transfer molding differs from vacuum resin infusion by infusing the preform with liquid resin under pressure with or without vacuum using a matched, two sided tool capable of withstanding the pressure. Fiber reinforced plastic structures have been commercially produced for some years. Examples of manufacturing techniques can be found in U.S. Pat. No. 5,052,906 Entitled "Plastic Transfer Molding Apparatus For The Production of Fiber Reinforced Plastic Structures", U.S. Pat. No. 5,601,852 Entitled "Unitary Vacuum Bag For Forming Fiber Reinforced Composite Articles And Process For Making Same", U.S. Pat. No. 4,132,755 Entitled "Process For Manufacturing Resin-Impregnated, Reinforced Articles Without The Presence Of Resin Fumes", U.S. Pat. No. 5,129,813 Entitled "Embossed Vacuum Bag, Methods For Producing And Using Said Bag", U.S. Pat. No. 4,902,215 Entitled "Plastic Transfer Molding Techniques For The Production Of Fiber Reinforced Plastic Structures", U.S. Pat. No. 4,942,013 Entitled "Vacuum Resin Impregnation Process", U.S. Pat. No. 5,439,635 Entitled "Unitary Vacuum Bag For Forming Fiber Reinforced Composite Articles And Process For Making Same", U.S. Pat. No. 5,281,388 Entitled "Resin Impregnation Process For Producing A ResinFiber Composite", U.S. Pat. No. 5,316,462 Entitled "Unitary Vacuum Bag For Forming Fiber Reinforced Composite Articles, and U.S. Pat. No. 2,913,036 Entitled Process And Apparatus For Molding Large plastic Structures", all of which are hereby fully incorporated herein by reference.

The process for producing these structures requires the incorporation of a resin or other flowable plastic material into a reinforcing fiber. Reinforcing fiber generally takes the form of one or more layers of a woven or felted fiber reinforcement, typically comprised of carbon, graphite, or fiberglass. The vacuum resin infusion or impregnation process is usually done by either a wet or dry fiber lay-up technique. In the wet fiber lay-up process, the resin "wetted" fiber reinforcement consists of a prepreg which already contains a resin and is laid up on a mold and cured.

In the dry lay-up process, the fiber reinforcement is laid up dry on a mold or form which serves as a mold. The form may be incorporated as part and parcel of the finish product. Thereafter, the fiber is sprayed, brushed, impregnated, infused, or otherwise coated or "wetted" with the resin. The resin is then cured to form the fiber reinforced plastic structure.

During the curing stage of either process, the structure can be placed in a vacuum to assist the curing process. To this end, vacuum bag techniques have been used to provide such vacuum assistance. In a vacuum technique, a flexible impervious sheet, liner, or bag is used to cover a single mold which contains the dry or wet (resin impregnated) fiber lay-up. In the wet fiber process, the edges of the flexible sheet are clamped against the mold to form an envelope and seal the resin impregnated fiber lay-up to the mold and out of the atmosphere. A vacuum is then applied to consolidate the preform during the cure of the resin. In the dry fiber lay-up, catalyzed liquid plastic or resin is generally introduced into the envelope or bag interior to wet the dry fiber, usually using a vacuum (usually applied before resin introduction) to help push the resin into the bag and wet out the dry fiber. Vacuum is applied to the bag interior via a vacuum line to collapse flexible sheet against the fiber and surface of the mold, and then the plastic wetted fiber is processed, compacted and cured to form the fiber reinforced structure. The vacuum bag used in this process is critical because it provides a vacuum seal and consolidation pressure.

Prior vacuum resin infusion processes have had a number of problems when fabricating a large part. One of the problems is that the height of the part is limited by the maximum practical vacuum pressure of $-14.7$ psi$=-\rho g h_{MAX}$ (where g is gravitational acceleration). Using conventional methods, the maximum part height ($h_{MAX}$) As about 33 ft., assuming a minimum resin density ($\rho$) of 1.03 grams per cm$^3$. Methods to overcome this 33 ft. limitation, such as multi-stage infusions, may be undesirable because the stage boundaries are subject to property variations. Another technique to overcome the 33 ft. limitation is to use pressurized injection. This may be undesirable however because of the risk of inflating the bag, or the cost associated with rigid matched tools. Also, vacuum resin infusion processes have typically been slow proportionally as the effective vacuum resin infusion pressure decreases as a function of height. Slow filling increases the risk of resin gelation before completing the infusion. Therefore, the risk of having a bad part increases as a function of height, especially above 20 ft.

Also, part height limits processing options such as "final vacuum". After filling with a high vacuum (>27" Hg), it is desirable to reduce the final vacuum to minimize porosity and control resin content. If the final vacuum is too high, the volatiles within the resin are more likely to boil, creating undesirable porosity. Also, high vacuum tends to yield low resin contents, which may be undesirable for some applications.

Another problem with prior vacuum resin infusion processes is that the effective processing pressure varies as a function of height per the formula $\rho gh$. This pressure gradient yields property variations, such as resin content as a function of height. Resin content variations yield variations in strength, modulus, toughness and specific gravity of the final part and are therefore undesirable.

Another problem with prior vacuum resin infusion processes is that thick parts have heretofore been vulnerable to excessive exotherm temperatures, which may lead to undesirable side effects. Resin curing is an exothermic reaction and a large mass of resin within thick sections supplies reaction energy which increases temperature further accelerating the reaction. Therefore, thick sections generally have poor heat transfer mechanisms so the curing reaction can get quite hot (>200° F.). Excessive heat has several undesirable side effects, such as the fact that it can decompose the laminate and seriously degrade mechanical and physical properties.Excessive heat can also create thermal shrinkage gradients, residual stresses and cracking. Also, excessive heat can boil volatiles (such as styrene) within the resin, and create excessive porosity which degrades mechanical and physical properties.

What is needed then is a technique for a vacuum resin infusion process which overcomes the deficiencies described above. Efforts in this area have led to continuing developments to improve their versatility, practicality and efficiency.

DISCLOSURE OF THE INVENTION

An object of the present invention is to provide a vacuum resin infusion process for a composite article which provides fluid pressure on the article.

Another object of the present invention is to provide a vacuum resin infusion process for a composite article which provides fluid pressure on the article while controlling temperature.

According to the present invention, a method of manufacturing a resin impregnated reinforced article comprises the steps of providing a permeable reinforcing material on a mold, sealing the material with a flexible, impervious sheet, introducing resin into the material, drawing a vacuum on the material within the sealed sheet, applying pressure on the flexible sheet and material with a fluid in contact with the impervious sheet.

According to another aspect of the present invention, a method of manufacturing a resin impregnated reinforced article comprises the steps of providing a permeable reinforcing material on a mold, sealing the material with a flexible, impervious sheet, introducing resin into the material, drawing a vacuum on the material within the sealed sheet, applying pressure on the flexible sheet and material with a fluid in contact with the impervious sheet, and controlling the temperature of the fluid.

The present invention provides a cost effective resin infusion process which permits the manufacture of parts with unlimited height while minimizing resin variations and the porosity of the finished part. The present invention also minimizes mechanical and physical degradation, thermal shrinkage gradients, residual stresses, and cracking. In addition, the present invention accelerates processing time.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BEST MODE FOR CARRYING OUT THE INVENTION

Figure 1:
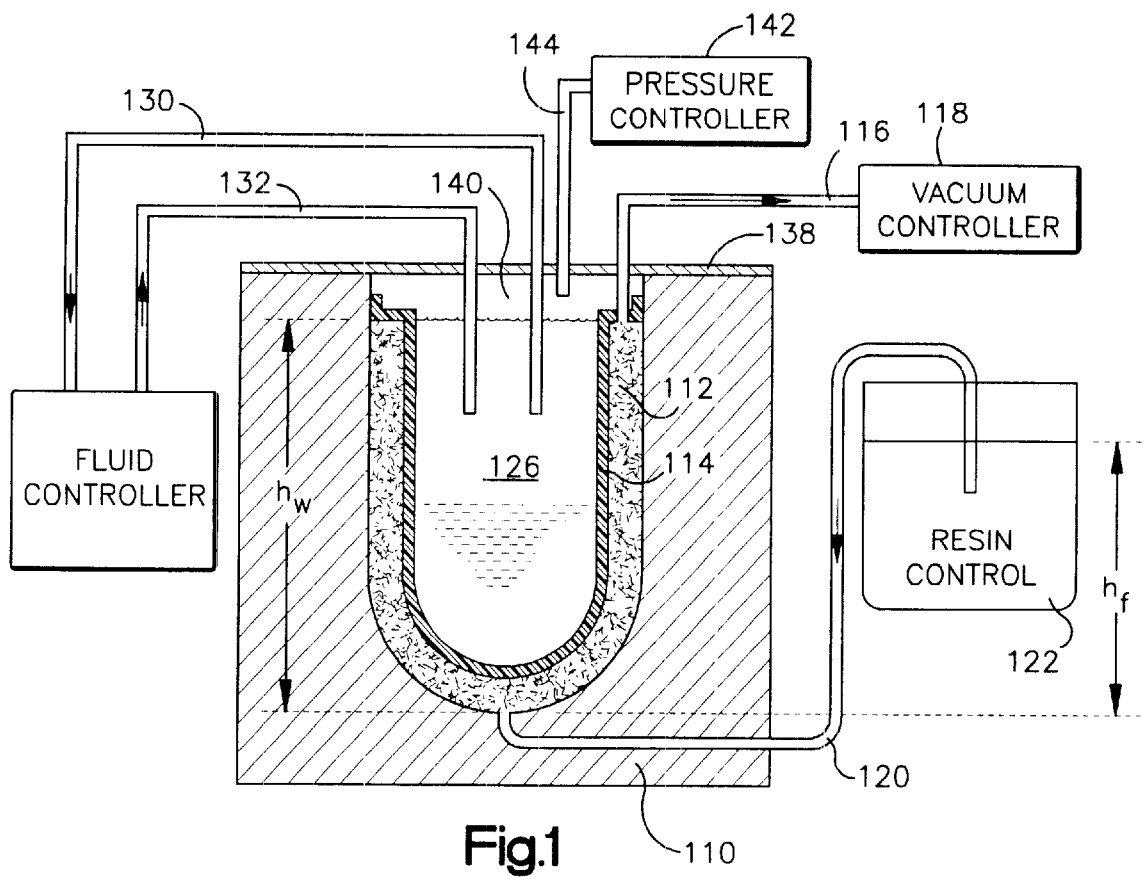
FIG. 1 is a simplified schematic diagram of a vacuum resin infusion process in accordance with the present invention.

Referring now to FIG. 1, a vacuum resin infusion process in accordance with the present invention, there is shown a mold 110 (or tool or film layer, etc.) in which a permeable fibrous reinforcing substrate 112 is to be placed to form a finished part. The mold is preferably a durable material with the appropriate amount of rigidity. The shape of the mold determines the shape of the finished part, and thus the mold can be curved or of any desired shape. The substrate is preferably comprised of a permeable, reinforced fibrous material such as a laminate or preformed cloth which is placed on top of the mold. Other types of reinforcing material structures known in the art, such as woven roving mat, continuous roving mat, or chopped mat may be used instead of or in addition to cloth. Furthermore, chopped fibers, continuous roving or certain agate fillers can also be used for this laminate if desired. The material for the reinforcing cloth or fibers may be any of a number of known materials that are utilized for vacuum resin transfer molding purposes, such as carbon, fiberglass, kevlar, nylon, graphite, or the like.

A sheet 114 of flexible, impermeable bag material is placed over the top of the substrate 112 and sealed to the mold around the substrate so as to seal the substrate within a chamber. An adhesive, such as tacky tape strips (not shown) may be utilized for the sealing purpose.

A vacuum line 116 provides access to the area between the impermeable bag 114 and the substrate 112. Vacuum is applied utilizing a vacuum controller 118. A line 120 provides access to the area between the substrate 112 and the mold 110 at the bottom of the mold. A resin source or controller 122 provides resin through line 122 to the substrate 112.

A fluid 126 is provided in contact with bag 114. In this case, the fluid is provided in the well created by the shape of the mold and substrate. A fluid controller 128 provides a fluid via lines 130, 132 and may control such things as the motion or movement of the fluid (to improve heat transfer), the pressure applied to the bag and the temperature of the fluid and bag. Fluid motion and pressure may be controlled using devices such as a pump or mixer.

A lid or cap 138 may be placed over the top of the mold 110 to thereby seal the chamber 140. A pressure controller 142 can be utilized to control the pressure within the mold chamber 140 via a line 144.

The process for impregnating the fibrous pre-form 112 according to the invention illustrated in FIG. 1 is to first apply the substrate 112 to the mold 110. The resin and vacuum lines 120 and 116 are secured over the substrate. The impervious vacuum bag 114 is disposed over the substrate, and the bag is sealed to the mold around the substrate. The bag is then evacuated utilizing the vacuum controller 118. A vacuum of about at least 27" Hg is preferred. The bag should be free of leaks. The bagged preform is then immersed with a fluid, (such as water) to the desired height $h_W$. The preform is protected from the fluid with the impervious vacuum bag. The fluid applies extra compaction pressure to the laminate.

Water is the preferred fluid, although other fluids may be used to accomplish the objectives of the present invention.

The resin line 120 is placed in a resin reservoir 122 which is below the highest point of the fluid. Fluid pressure prevents the bag from inflating, even when injecting resin under pressure so that the resin reservoir may be placed near the highest point of the mold to apply maximum infusion pressure. High infusion pressure accelerates resin flow, which minimizes infusion time. The resin line is then opened and the pre-form is infused with the resin. The water reservoir equalizes the pressure as a function of height because both the water pressure and the effective resin pressure vary as a function of ρgh. If the fluid's specific gravity simulates the resin's specific gravity, the effective pressure will be constant across the entire height. The process of the present invention is therefore not limited by the height of the part. Some applications may require to keep the resin reservoir at the lowest point and inject the resin under pressure.

The amount of pressure introduced by the resin is a function of the height of the resin according to the equation $P_R = \rho_R g h_R$ were $\rho_R$ is the density of the resin and $h_R$ is the height of the resin. The pressure exerted by the fluid is determined by the equation $P_w = \rho_w g h_w$.

For additional pressure control on the substrate 112, a pressure controller 142 can introduce pressure into the sealed compartment via line 144 if the compartment 140 is sealed, such as by a lid or cap 138. Additionally, resin controller 122 could provide the resin under pressure utilizing forces other than gravity (such as with a pump or other means). Heretofore, resin could not be introduced under pressure because it would cause the impermeable bag to inflate. With the present invention, resin can be provided up to the pressure applied by the fluid outside the bag ($P_R = P_W$) without inflating the bag.

After the reinforcing material (or part) is filled or impregnated with resin, the vacuum can be reduced to the desired level, and the part is allowed to cool. To this end, controlling the temperature of the fluid provides heat transfer in order to help control the temperature of the reaction.

During the curing process, fluid controller 128 can adjust the temperature of the fluid 126 such that the substrate can be cured without having to move it to a different facility, such as an autoclave. The fluid controller can work in any of a number of different manners, such as to have the fluid flow through the controller via a pump such that the fluid is circulating in the reservoir. The fluid controller may also include a coil or element type temperature controller which either is cooled or heated according to the desired process temperature.

Figure 2:
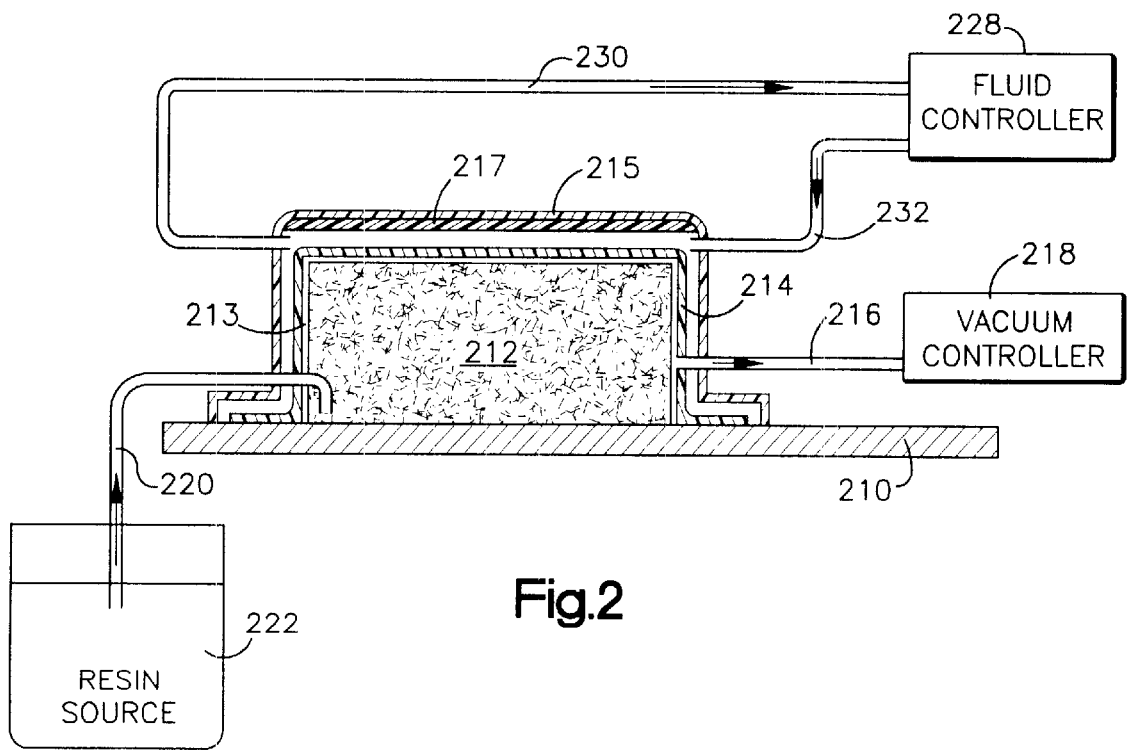
FIG. 2 is a simplified schematic diagram of a vacuum resin infusion process in accordance with an alternative embodiment of the present invention.

Referring now to FIG. 2 wherein an alternative embodiment of the present invention is shown. A fiber substrate 212 is placed on a mold 210. A fluid impervious bag 214 is placed over the substrate 212 and sealed to the mold. A second fluid impervious bag 215 is placed over the first bag 214 and sealed. A vacuum controller 218 provides a vacuum via a line 216 to the area between the first bag 214 and the substrate 212. A resin controller 222 introduces resin via a line 220 into the substrate 212. A fluid controller 228 provides a fluid via lines 230, 232 in the space between bag 214 and 215 and may control such things as the motion of the fluid (to improve heat transfer), the pressure applied to the bag and the temperature of the bag. Fluid motion and pressure may be controlled using devices such as a pump or mixer.

An additional layer 217 may be disposed between bag 214 and bag 215 and may be textured for providing channels for for the fluid to flow during and/or after the infusion of the resin.

The process for the system illustrated in FIG. 2 is conducted as follows. After assembly of the mold, substrate, and bagging material, a vacuum is created via vacuum controller 218 via line 216. The vacuum removes air from the cavity or envelope 213 and collapses the bags 214, 215. The pressure differential across the envelope 213 pulls resin from resin source or controller 222 through line 220. Resin will thereafter flow from the bottom of the molds 210 to the top of the substrate and impregnate the pre-form 212 with the resin material. Fluid controller 228 controls the motion, pressure and temperature of fluid located between the inner bag 214 and the outer bag 215 during the curing process.

Figure 3:
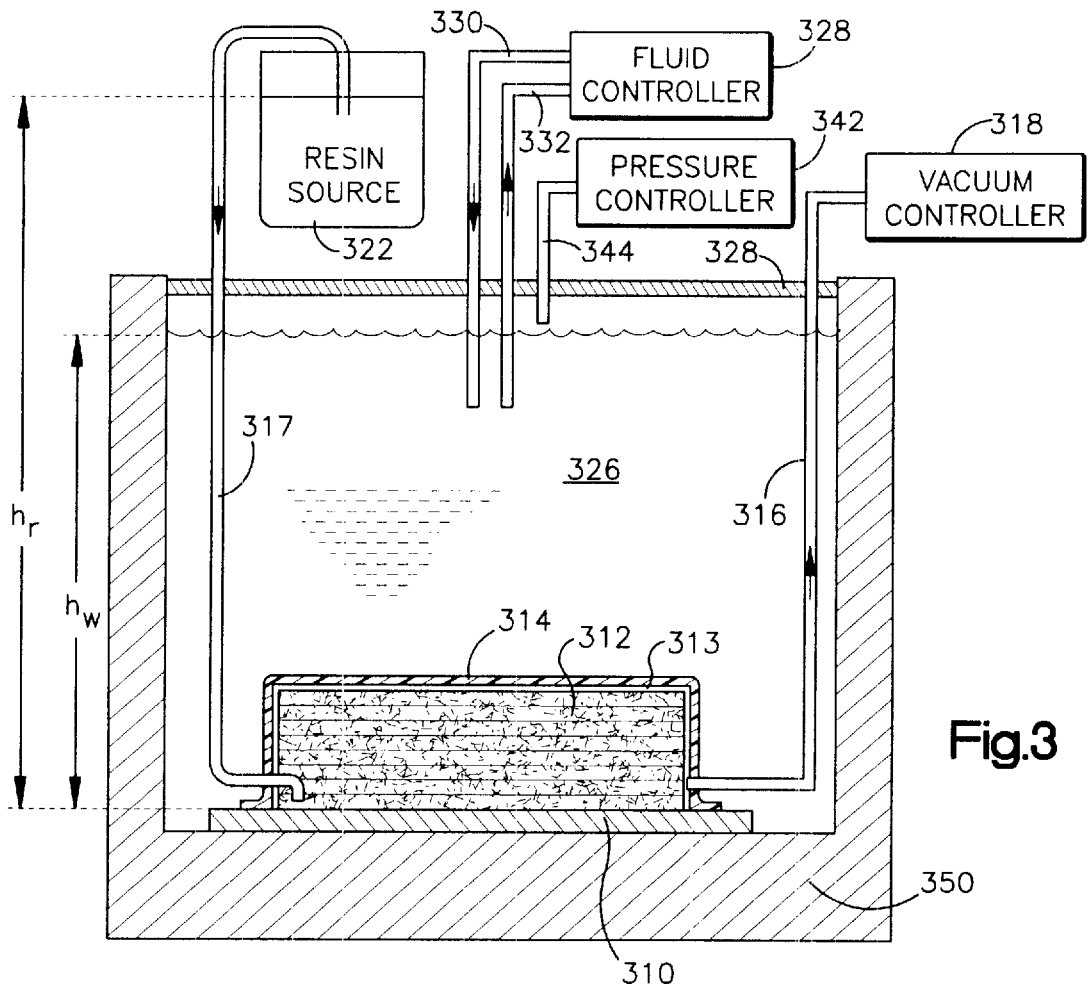
FIG. 3 is a simplified schematic diagram of a vacuum resin infusion process in accordance with an alternative embodiment of the present invention.

Referring now to FIG. 3, an alternative embodiment of a vacuum resin infusion process in accordance with the present invention includes the use of a tool 310 on which a laminate or substrate 312 is placed. An impermeable bag 314 is placed and sealed over the substrate 312, leaving a void 313 provided therebetween. A vacuum controller 318 provides a vacuum in the space 313 via a line 316. A resin source or controller 322 provides a resin to the laminate 312 via a line 317. The tool 310, substrate 312, and bag 314 are placed in a container 350 filled with a fluid 326.

An additional, textured layer such as bubble wrap, may be disposed between bag 314 and substrate 312 for providing channels for resin to flow through during the infusion of the resin.

A fluid controller 328 controls the fluid 326 via lines 330, 332 and may control such things as the pressure, motion or circulation of the fluid (to improve heat transfer) and the temperature of the fluid. A pressure controller 342 controls the pressure inside the container 350 via a line 344. A lid or cap 338 can be placed over the container in order to more effectively control the pressure within the container.

Figure 4:
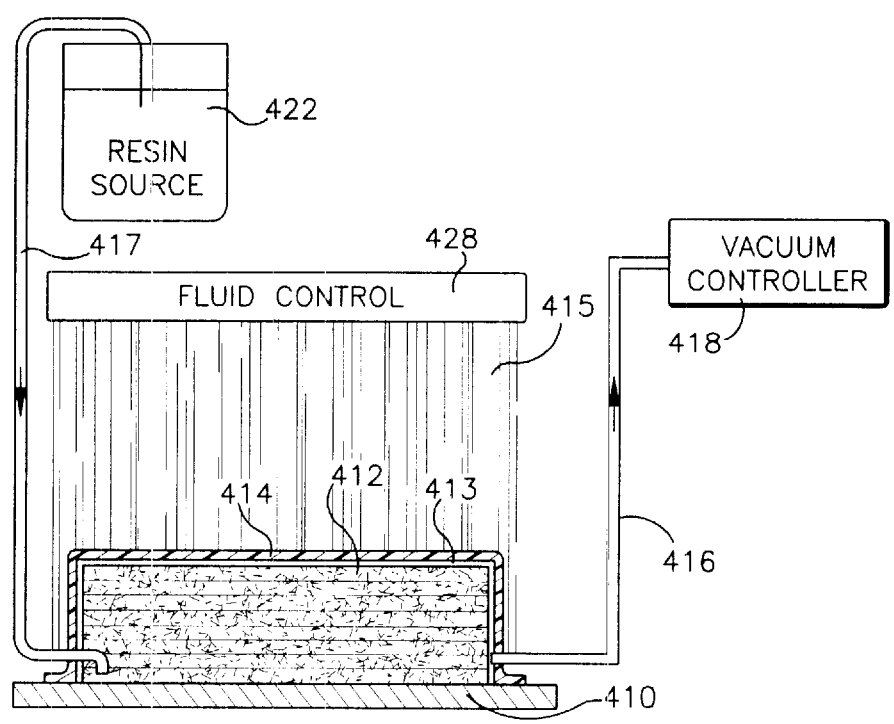
FIG. 4 is a simplified schematic diagram of a vacuum resin infusion process in accordance with an alternative embodiment of the present invention.

Referring now to FIG. 4, an alternative embodiment of a vacuum resin infusion process in accordance with the present invention includes the use of a tool 410 on which a laminate or substrate 412 is placed. An impermeable bag 414 is placed and sealed over the substrate 412, leaving a void 413 provided therebetween. A vacuum controller 418 provides a vacuum in the space 413 via a line 416. A resin source or controller 422 provides a resin to the laminate 412 via a line 417.

An additional, textured layer such as bubble wrap, may be disposed between bag 414 and substrate 412 for providing channels for resin to flow through during the infusion of the resin.

A fluid controller 428 sprays or pours a fluid 415 on the surface of the impermeable bagging material in order to control the temperature of the curing process. This method, however, does not lend itself to as accurate control of the temperature as the previously described methods.

It is to be understood from the previous description that the many variables can be adjusted during the process of the present invention in order to obtain the desired part and process characteristics. Among these include resin injection pressure, applied vacuum, fluid pressure, fluid density, fluid heat transfer characteristics, resin temperature and fluid temperature. With the present invention, it is possible to obtain a gradient in hydrostatic pressure ($\rho_R g h_R$) while maintaining a constant net pressure ($\rho_R g h_R$ minus the pressure outside the bag). Also, the present process facilitates controls so as to keep the vapor pressure of the resin below the pressure inside the impermeable bag.

An example of a variation in the present process would be to vary the temperature of the fluid during the course of the manufacturing process. During exothermic vacuum resin infusion and curing phases, the fluid can be kept lower in order to draw heat from the part. Once the resin has hardened to a specific degree, the temperature of the fluid can be raised to further cure the part in order to increase the glass transition temperature, strength and stiffness of the part. With the appropriate fluid and pressure, the temperature can be raised significantly for this post bake or curing process.

The molds and tools of the present invention are preferably made from a rigid or semi-rigid, wear resistant material which is easily cleaned of all resin residue. Such mold materials are well known in the art and include metals, plastic, reinforced plastics, etc.

The bagging materials may be any of a number of suitable materials known to those skilled in the art, such as thermoplastic polyamide films, polyurethane, nylon, polyethylene, terephthalate(PET), polyether keytone (PEEK), polyetherimide (PEI), polyether sulfone (PES), etc.

It is to be noted that the present invention allows uniform pressure on the part throughout the height of the part, without the need for costly rigid tooling. The present invention provides laminate compaction in excess of 14.7 psi without an autoclave or matched tooling.

The present invention also provides for a low cost temperature control without the need for expensive cooling systems to the mold. To this end, previous molds with cooling or temperature control could only control the temperatures on the mold surface of thick laminates. The bag side of thick parts, however, heretofore had higher porosity than the mold surface. The thermal control provided by the present invention offers an effective way to prevent this.

Although the invention has been shown and described with exemplary embodiments thereof, it should be understood by those skilled in the art that the forgoing and various other changes, omissions and additions may be made therein and thereto without departing from the spirit and scope of the invention.

What is claimed is:

1. A method of manufacturing a resin impregnated reinforced article having a height h, said method comprising the steps of:

providing a permeable reinforcing material on a mold;

placing a flexible, impervious sheet over the reinforcing material and sealing the flexible, impervious sheet to the mold to form with the mold a sealed chamber containing the reinforcing material;

introducing resin into the reinforcing material so that the resin within the permeable reinforcing material will be at a resin pressure that varies as a function of the height h;

drawing a vacuum on the reinforcing material within the sealed chamber;

applying liquid pressure on the flexible, impervious sheet and reinforcing material with a reservoir of a liquid in contact with the flexible, impervious sheet on a side thereof opposite the reinforcing material, so that the liquid pressure of the reservoir equalizes the resin pressure as a function of the height h, wherein both the liquid pressure and the resin pressure vary as a function of $\rho gh$, wherein $\rho$ is the density of the liquid/resin and g is the gravitational acceleration.

2. A method in accordance with claim 1, wherein the mold and reinforcing material form a cavity and wherein the liquid reservoir is contained within this cavity.

3. A method as set forth in claim 2, wherein the pressure-applying step comprises providing a fluid controller, a supply line from the fluid controller which supplies the liquid to the cavity, and a return line which returns the liquid from the cavity back to the fluid controller and wherein the fluid controller controls fluid motion through the supply and return lines.

4. A method in accordance with claim 1, further comprising the step of controlling the temperature of the liquid reservoir.

5. A method in accordance with claim 4, wherein the temperature controlling step comprises cooling or heating the liquid.

6. A method as set forth in claim 5, wherein the pressure-applying step comprises causing the liquid to flow in a space around the sealed enclosure.

7. A method as set forth in claim 6, wherein the flexible impervious sheet is a first bag and wherein the space is between the first bag and a second bag placed over the first bag.

8. A method in accordance with claim 1, wherein the liquid is water.

9. A method as set forth in claim 1, wherein the specific gravity of the liquid simulates the specific gravity of the resin.

10. A method as set forth in claim 1, wherein the resin-supplying step comprises supplying resin from a resin source which is located below the highest point of the liquid within the reservoir.

11. A method as set forth in claim 1, wherein the pressure-applying step comprises placing the mold, the sheet, and the resin within the liquid reservoir.

12. A method as set forth in claim 11, wherein the specific gravity of the liquid simulates the specific gravity of the resin.

13. A method of manufacturing a resin impregnated reinforced article having a height h, said method comprising the steps of:

providing a permeable reinforcing material on a mold;

placing a flexible, impervious sheet over the reinforcing material and sealing the flexible, impervious sheet to the mold to form with the mold a sealed chamber containing the reinforcing material;

introducing resin into the reinforcing material so that the resin within the permeable reinforcing material will be at a resin pressure that varies as a function of the height h;

drawing a vacuum on the reinforcing material within the sealed chamber;

applying liquid pressure on the flexible, impervious sheet and reinforcing material with a reservoir of a liquid in contact with the flexible, impervious sheet on a side thereof opposite the reinforcing material, so that the liquid pressure of the reservoir equalizes the resin pressure as a function of the height h, wherein both the liquid pressure and the resin pressure vary as a function of $\rho gh$, wherein $\rho$ is the density of the liquid/resin and g is the gravitational acceleration; and wherein the pressure applying step comprises providing a second flexible, impervious sheet around the first flexible, impervious sheet and providing the liquid reservoir between the first and second flexible impervious sheets.

14. A method of manufacturing a resin impregnated reinforced article having a height h, said method comprising the steps of:

providing a permeable reinforcing material on a one-sided mold;

placing a flexible, impervious sheet over the reinforcing material and sealing the flexible, impervious sheet to the mold to form with the mold a sealed chamber containing the reinforcing material;

introducing resin into the reinforcing material so that the resin within the permeable reinforcing material will be at a resin pressure that varies as a function of the height h;

drawing a vacuum on the reinforcing material within the sealed chamber;

applying liquid pressure on the flexible, impervious sheet and reinforcing material with a reservoir of a liquid in contact with the flexible, impervious sheet on a side thereof opposite the reinforcing material, so that the liquid pressure of the reservoir equalizes the resin pressure as a function of the height h, wherein both the liquid pressure and the resin pressure vary as a function of $\rho gh$, wherein $\rho$ is the density of the liquid/resin and g is the gravitational acceleration; and wherein the pressure applying step comprises immersing the mold, the sheet and resin into the liquid reservoir.

15. A method of manufacturing a resin impregnated reinforced article comprising the steps of:

providing a permeable reinforcing material on a mold;

placing a flexible, impervious sheet over the reinforcing material and sealing the flexible, impervious sheet to the mold to form with the mold a sealed chamber containing the reinforcing material;

introducing resin into the reinforcing material;

drawing a vacuum on the reinforcing material within the sealed chamber;

applying pressure on the flexible, impervious sheet and reinforcing material with fluid in contact with the flexible, impervious sheet on a side thereof opposite the reinforcing material;

wherein the pressure applying step comprises providing a second flexible, impervious sheet around the first flexible, impervious sheet and providing the fluid between the first and second flexible impervious sheets;

wherein a textured layer is interposed between the first and second flexible, impervious sheets to form channels between the first and second flexible impervious sheets, and the fluid is caused to flow through the channels.

16. A method of manufacturing a resin impregnated reinforced article having a height h, said method comprising the steps of:

providing a permeable reinforcing material on a mold;

placing a flexible, impervious sheet over the reinforcing material and sealing the flexible, impervious sheet to the mold to form with the mold a sealed chamber containing the reinforcing material;

introducing resin into the reinforcing material so that the resin within the permeable reinforcing material will be at a resin pressure that varies as a function of the height h;

drawing a vacuum on the reinforcing material within the sealed chamber;

applying liquid pressure on the flexible, impervious sheet and reinforcing material with a reservoir of a liquid in contact with the flexible, impervious sheet on a side thereof opposite the reinforcing material, so that the liquid pressure of the reservoir equalizes the resin pressure as a function of the height h, wherein both the liquid pressure and the resin pressure vary as a function of $\rho gh$, wherein $\rho$ is the density of the liquid/resin and g is the gravitational acceleration; and wherein the resin is introduced into the reinforcing material by vacuum infusion.

17. A method of manufacturing a resin impregnated reinforced article comprising the steps of:

providing a permeable reinforcing material on a mold;

placing a flexible, impervious sheet over the reinforcing material and sealing the flexible, impervious sheet to the mold to form with the mold a sealed chamber containing the reinforcing material;

introducing resin into the reinforcing material;

drawing a vacuum on the reinforcing material within the sealed chamber;

applying pressure on the flexible, impervious sheet and reinforcing material with fluid in contact with the flexible, impervious sheet on a side thereof opposite the reinforcing material, wherein the fluid is a liquid;

further comprising the step of controlling the temperature of the fluid by heating or cooling the fluid;

wherein the pressure-applying step comprises causing the fluid to flow in a space around the sealed enclosure;

wherein the flexible impervious sheet is a first bag and wherein the space is between the first bag and a second bag placed over the first bag; and wherein a textured layer is interposed between the first and second bags thereby forming channels therebetween and wherein the fluid passes through the channels as it flows through the space.

18. A method of manufacturing a resin impregnated reinforced article having a height h, said method comprising the steps of:

providing a permeable reinforcing material on a mold;

placing a flexible, impervious sheet over the reinforcing material and sealing the flexible, impervious sheet to the mold to form with the mold a sealed chamber containing the reinforcing material;

introducing resin into the reinforcing material so that the resin within the permeable reinforcing material will be at a resin pressure that varies as a function of the height h;

drawing a vacuum on the reinforcing material within the sealed chamber;

applying liquid pressure on the flexible, impervious sheet and reinforcing material with a reservoir of a liquid in contact with the flexible, impervious sheet on a side thereof opposite the reinforcing materials, so that the liquid pressure of the reservoir equalizes the resin pressure as a function of the height h, wherein both the liquid pressure and the resin pressure vary as a function of $\rho gh$, wherein $\rho$ is the density of the liquid/resin and g is the gravitational acceleration; and wherein the specific gravity of the liquid is approximately equal to the specific gravity of the resin.

19. A method as set forth in claim 18, wherein the mold and reinforcing material form a cavity and wherein the liquid reservoir is contained within this cavity.

20. A method of manufacturing a resin impregnated reinforced article comprising the steps of:

providing a permeable reinforcing material on a mold;

placing a flexible, impervious sheet over the reinforcing material and sealing the sheet to the mold to form a sealed chamber containing the reinforcing material;

introducing resin into the reinforcing material;

drawing a vacuum on the reinforcing material within the sealed chamber;

applying pressure on the reinforcing material by placing fluid in contact with a side of the sheet opposite the reinforcing material;

wherein the mold and the reinforcing material form a cavity in which the fluid is contained; and wherein the cavity has a vertical dimension greater than its horizontal dimensions and wherein the effective pressure is substantially constant across the height of the reinforcing material.

21. A method of manufacturing a resin impregnated reinforced article having a height h, said method comprising the steps of:

providing a permeable reinforcing material on a mold;

placing a flexible, impervious sheet over the reinforcing material and sealing the flexible, impervious sheet to the mold to form with the mold a sealed chamber containing the reinforcing material;

introducing resin into the reinforcing material so that the resin within the permeable reinforcing material will be at a resin pressure that varies as a function of the height h;

drawing a vacuum on the reinforcing material within the sealed chamber;

applying liquid pressure on the reinforcing material with a reservoir of liquid in contact with a side of the sheet opposite the reinforcing material, so that the liquid pressure of the reservoir equalizes the resin pressure as a function of the height h, wherein both the liquid pressure and the resin pressure vary as a function of $\rho gh$, wherein $\rho$ is the density of the liquid/resin and g is the gravitational acceleration;

the mold and the reinforcing material form a cavity;

the liquid is contained within the cavity; and the specific gravity of the liquid simulates the specific gravity of the resin.

22. A method of manufacturing a resin impregnated reinforced article comprising the steps of:

providing a permeable reinforcing material on a mold;

placing a flexible, impervious sheet over the reinforcing material and sealing the sheet to the mold to form a sealed chamber containing the reinforcing material, introducing resin into the reinforcing material;

drawing a vacuum on the reinforcing material within the sealed chamber;

applying pressure on the reinforcing material by placing fluid in contact with a side of the sheet opposite the reinforcing material, wherein:
the mold and the reinforcing material form a cavity;
the fluid is contained within the cavity; and
the specific gravity of the fluid simulates the specific gravity of the resin whereby the effective pressure will be substantially constant across the height of the cavity;

wherein the height of the cavity formed by the mold and the reinforcing material is greater than twenty feet.

23. A method of manufacturing a resin impregnated reinforced article comprising the steps of:

providing a permeable reinforcing material on a mold;

placing a flexible, impervious sheet over the reinforcing material and sealing the sheet to the mold to form a sealed chamber containing the reinforcing material;

introducing resin into the reinforcing material;

drawing a vacuum on the reinforcing material within the sealed chamber;

applying pressure on the reinforcing material by placing fluid in contact with a side of the sheet opposite the reinforcing material, wherein:
the mold and the reinforcing material form a cavity;
the fluid is contained within the cavity; and
the specific gravity of the fluid simulates the specific gravity of the resin whereby the effective pressure will be substantially constant across the height of the cavity;

wherein the height of the cavity formed by the mold and the reinforcing material is equal to or greater than thirty feet.

24. A method of manufacturing a resin impregnated reinforced article having a height greater than twenty feet, said method comprising the steps of:

providing a one-sided mold;

placing a permeable reinforcing material on the one-sided mold to form a shape having a height greater than twenty feet;

placing a flexible, impervious sheet over the reinforcing material and sealing the flexible, impervious sheet to the mold to form with the mold a sealed chamber containing the reinforcing material;

introducing resin into the reinforcing material;

drawing a vacuum on the reinforcing material within the sealed chamber;

supplying a fluid having a specific gravity which simulates the specific gravity of the resin;

applying pressure on the reinforcing material by placing the fluid in contact with the sheet whereby the effective pressure will be substantially constant across the height of the shape formed by the permeable reinforcing material.

25. A method as set forth in claim 24, herein said mold-providing and material-placing steps result in the shape formed by the permeable reinforcing material including a cavity having a height greater than twenty feet and wherein the fluid is contained within the cavity.

26. A method as set forth in claim 24, wherein said mold-providing and material-placing steps result in the shape formed by the permeable reinforcing material including a cavity having a height greater than thirty feet and wherein the fluid is contained within the cavity.

27. A method as set forth in claim 24, wherein said fluid-supplying step comprises supplying a liquid.

28. A method as set forth in claim 27, wherein said fluid-supplying step comprises supplying water.

29. A method as set forth in claim 27, further comprising the step of controlling the temperature of the fluid.

* * * * *